Patented June 26, 1934

1,964,358

UNITED STATES PATENT OFFICE 1,964,358

LIGHT-SENSITIVE LAYERS CONTAINING A TITANIUM SALT OF AN ORGANIC HYDROXY ACID AND PROCESS OF PREPARING THEM

Wilhelm Krieger, Wiesbaden-Biebrich, Germany, assignor to Kalle & Co., Aktiengesellschaft, Wiesbaden-Biebrich, Germany No Drawing. Application October 11, 1932, Serial No. 637,365. In Germany October 19, 1931

18 Claims. (Cl. 95—7).

The present invention relates to light-sensitive materials including a light-sensitive preparation containing a titanium salt of an organic hydroxy acid and to a process of preparing them.

We have found that the addition of a titanium salt of an organic hydroxy acid to light-sensitive preparations containing a diazo compound yields preparations which are quite suitable for the manufacture of light-sensitive materials for use in preparation of diazo-types. The new material has the special advantages that the tints of the diazo types can be varied to a considerable extent. Besides neutral tones, there may also be obtained tones which are suitable for color photography, for instance a green or a blue tone. The tones may be influenced to a considerable extent, for instance, by the method of preparation of the titanium mordant, furthermore by addition of salts or an excess of organic hydroxy acids or salts thereof. When using regenerated cellulose as the support, the tones may furthermore likewise be considerably varied by addition of polyhydroxy compounds and softening agents.

The present invention is carried out by adding a titanium salt of an organic hydroxy acid to the light-sensitive preparations containing a diazo compound alone or in mixture with an azo component. This is preferably done during the preparation of the light-sensitive material, but it may be also possible to add the salt to a developing solution. Suitable for the present process are titanium salts of all organic hydroxy acids, such as for instance, tartaric acid, lactic acid, citric acid and the like, and especially the complex salts of titanium with these acids. The complex salts are preferably made by dissolving titanic acid or a hydrate thereof in the corresponding hydroxy acids or the acid salts thereof and then neutralizing the solution.

This method of preparation is applied when the mordant is to be used in as pure a form as possible and without unnecessary additions of salt. If the purity of the base is less important, organic hydroxy acids or the salts thereof may also be added to the solutions of titanium alkali oxalates or titanium alkali fluorides. A transformation takes place which can be recognized in that on addition of ammonia no titanic acid is precipitated from those solutions, according to the behavior of the complex salts of titanic acid with organic hydroxy acids. The additions may also be made to a light-sensitive solution which already contains the corresponding titanium salts.

The use of complex salts of titanic acid and organic hydroxy acids has the special advantage that light-sensitive preparations can be applied on or incorporated into each desired base, for instance, paper, film or the like, with addition of titanium salts. This could not be done with the aid of the titanium alkali oxalate, which was formerly known for this purpose, and the titanium alkali fluorides, since these salts, for instance during the sensitization of films, particularly those of regenerated cellulose, or during the manufacture of gelatin emulsions, have certain drawbacks. By impregnating a film from regenerated cellulose with a light-sensitive solution containing titanium potassium oxalate, a precipitate of calcium oxalate is soon produced on the surface of the film, which is caused by the contents of calcium carbonate of the film from the manufacture. When using titanium alkali fluorides or simple titanium salts, such as for instance, titanium sulfate or titanium tetrachloride, the hydrolysis of these compounds entails difficulties and drawbacks which are important for the support and the gelatin emulsion.

The following examples illustrate the invention, the parts being by weight unless otherwise stated.

1. Regenerated cellulose is impregnated with a light-sensitive solution, 1000 parts by volume of which contain 7.5 parts of 1.2.4-diazonaphtholsulfonic acid, 6 parts of dichloro-resorcinol, 60 parts of butylene glycol, 1 part by volume of lactic acid and 6 parts of the sodium salt of titanium-citric acid (Kahlbaum). After exposure to light under a positive, development with gaseous ammonia and, if required, in the presence of a moist and warm atmosphere, an olive tone is obtained. On exposing to the air, the same tone is obtained after several days. By using instead of 1.2.4-diazo-naphtholsulfonic acid the corresponding 2.1-derivative, a green tone is obtained. Furthermore, when using phloroglucine instead of dichloro-resorcinol, a greenish black is obtained. By the addition of increasing quantities of sodium citrate, the tone may be varied from brown-black to brown. The same or similar tones can be obtained by using titanium potassium oxalate and adding corresponding quantities of sodium citrate.

2. A film from regenerated cellulose or a gelatinized nitrocellulose film is impregnated with a solution, 1000 parts of which contain 7.5 parts of 1.2.4-diazonaphtholsulfonic acid, 1.7 parts of phloroglucine, 20 parts of the sodium salt of titanium-citric acid (Kahlbaum), 60 parts by volume of glycerine and 1 part by volume of lactic acid. After exposure to light under a design and subsequent development in gaseous ammonia, a reddish-violet positive picture is obtained which, when exposed to the air or treated with steam, assumes a brownish-black tone. By using instead of 1.2.4-diazonaphtholsulfonic acid the corresponding 2.1-derivative and instead of the sodium salt of titanium-citric acid the corresponding salt of the titanium tartaric acid, copies with a neutral to bluish-black tone are obtained.

3. 5.5 parts of 2.1.4-diazonaphtholsulfonic acid, 1.2 parts of phloroglucine, 7.5 parts of titanium potassium oxalate, 20 parts of disodium citrate, 60 parts by volume of butylene glycol and 1 part by volume of lactic acid are dissolved in water and made up to 1000 parts. A film from regenerated cellulose is impregnated with this solution; after exposure to light, development in gaseous ammonia and exposure to air for a prolonged time, a bluish-black picture is produced. By treating the picture with steam after the development, it assumes a neutral black tone. When using the equivalent quantities of ammonium tartrate instead of disodium citrate and treating with steam after the development, a neutral brown tone is obtained.

4. A film from regenerated cellulose is impregnated with a light-sensitive solution, 1000 parts by volume of which contain 7.5 parts of 1.2.4-diazonaphtholsulfonic acid, 20 parts of the sodium salt of titanium-citric acid (Kahlbaum), 60 parts by volume of glycerine and 1 part by volume of lactic acid.

The film is then exposed to light under a design and developed with an aqueous-alcoholic developing solution which is composed as follows: 3 parts of phloroglucine, 50 parts by volume of alcohol, 10 parts by volume of glycerine, 35 parts by volume of water and 5 parts by volume of concentrated ammonia.

After development a bluish-red picture is obtained which, when treated with steam, assumes a bluish-black tone.

5. A cellulose hydrate foil is impregnated with a light-sensitive solution, 1000 parts by volume of which contain 7.5 parts of 1.2.4-diazonaphtholsulfonic acid, 60 parts by volume of glycerine and 1 part by volume of lactic acid.

It is exposed to light under a design, for instance, under a positive, and developed with the following developer: 3 parts of phloroglucine, 50 cc. of alcohol, 10 cc. of glycerine, 5 cc. of ammonia, 35 cc. of water and 3 parts of the sodium salt of titanium-citric acid (Kahlbaum). A red positive is obtained which, when treated with steam, assumes a brownish-black tone.

I claim:

1. In the process of preparing light-sensitive materials by means of a light-sensitive preparation containing a diazo compound, the step which comprises adding a titanium salt of an organic hydroxy acid to the light-sensitive preparation.

2. In the process of preparing light-sensitive materials by means of a light-sensitive preparation containing a diazo compound, the step which comprises adding a complex salt of titanium with an organic hydroxy acid to the light-sensitive preparation.

3. In the process of preparing light-sensitive materials by means of a light-sensitive preparation containing a diazo compound, the step which comprises adding a titanium salt of an aliphatic hydroxy acid to the light-sensitive preparation.

4. In the process of preparing light-sensitive materials by means of a light-sensitive preparation containing a diazo compound, the step which comprises adding a complex salt of titanium with an aliphatic hydroxy acid to the light-sensitive preparation.

5. In the process of preparing light-sensitive materials by means of a light-sensitive preparation containing a diazo compound, the step which comprises adding titanium potassium oxalate and disodium citrate to the light-sensitive preparation.

6. In the process of preparing light-sensitive materials by means of a light-sensitive preparation containing a diazo compound, the step which comprises adding titanium sodium citrate to the light-sensitive preparation.

7. In the process of preparing light-sensitive materials by means of a light-sensitive preparation containing a diazo compound, the step which comprises adding titanium sodium tartrate to the light-sensitive preparation.

8. Light-sensitive materials, the light-sensitive preparation of which comprises a diazo compound and a titanium salt of an organic hydroxy acid.

9. Light-sensitive materials, the light-sensitive preparation of which comprises a diazo compound, an azo dyestuff component and a titanium salt of an organic hydroxy acid.

10. Light-sensitive materials, the light-sensitive preparation of which comprises a diazo compound and a complex salt of titanium with an organic hydroxy acid.

11. Light-sensitive materials, the light-sensitive preparation of which comprises a diazo compound, an azo dyestuff component and a complex salt of titanium with an organic hydroxy acid.

12. Light-sensitive materials, the light-sensitive preparation of which comprises a diazo compound and a titanium salt of an aliphatic hydroxy acid.

13. Light-sensitive materials, the light-sensitive preparation of which comprises a diazo compound, an azo dyestuff component and a titanium salt of an aliphatic hydroxy acid.

14. Light-sensitive materials, the light-sensitive preparation of which comprises a diazo compound and a complex salt of titanium with an aliphatic hydroxy acid.

15. Light-sensitive materials, the light-sensitive preparation of which comprises a diazo compound, an azo dyestuff component and a complex salt of titanium with an aliphatic hydroxy acid.

16. Light-sensitive materials, the light-sensitive preparation of which comprises a diazo compound, an azo dyestuff component, titanium potassium oxalate and disodium citrate.

17. Light-sensitive materials, the light-sensitive preparation of which comprises a diazo compound, and azo dyestuff component and titanium sodium citrate.

18. Light-sensitive materials, the light-sensitive preparation of which comprises a diazo compound, an azo dyestuff component and titanium sodium tartrate.

WILHELM KRIEGER.